United States Patent [19]

Eriksson

[11] Patent Number: 4,898,459
[45] Date of Patent: Feb. 6, 1990

[54] READING SPECTACLES

[75] Inventor: Carl E. Eriksson, Djursholm, Sweden

[73] Assignee: Iris Optics Ltd., London, England

[21] Appl. No.: 113,819

[22] PCT Filed: Dec. 2, 1986

[86] PCT No.: PCT/GB86/00735
§ 371 Date: Oct. 1, 1987
§ 102(e) Date: Oct. 1, 1987

[87] PCT Pub. No.: WO87/03382
PCT Pub. Date: Jun. 4, 1987

[30] Foreign Application Priority Data
Dec. 2, 1985 [GB] United Kingdom ............. 8529595

[51] Int. Cl.$^4$ .................................................. G02C 7/16
[52] U.S. Cl. .................................................. 351/46
[58] Field of Search ............... 351/44, 45, 46, 246; 33/200

[56] References Cited

U.S. PATENT DOCUMENTS
1,452,909 4/1923 Covelle .
1,981,439 11/1934 Smith .

FOREIGN PATENT DOCUMENTS
1408211 7/1965 France .
1472506 3/1967 France .

Primary Examiner—Rodney B. Bovernick
Attorney, Agent, or Firm—Bacon & Thomas

[57] ABSTRACT

Reading spectacles are tested for acceptability by a user by providing each lens with a releasable opaque film having a small circular window aligned with the optical center of the lens. Acceptable spectacles are determined by the optical centers of the lenses being sufficiently aligned with the optical centers of the eyes to permit reading through the restricted field of view afforded by the windows.

7 Claims, 1 Drawing Sheet

READING SPECTACLES

This specification relates to spectacles and in particular to reading spectacles, i.e. spectacles for correcting presbyopia.

Presbyopia is frequently found in people from about age forty five onwards. It can occur as a natural part of the ageing process in people who have previously had good sight. It is usually possible to correct such presbyopia with lenses in the range of about +0.50 to +3.50 diopters. Generally, the right and left lenses are the same power because the two eyes in an individual age at the same rate.

Due to the nature of such presbyopia it is considered acceptable for people to choose ready made reading spectacles from a range, by testing them for comfort and clarity when reading. There are those who consider it necessary for an optician to be involved but a person should be reasonably capable of selecting spectacles with lenses of the correct power, without professional assistance. There are countries in the world where opticians do not have a monopoly and ready made reading glasses are freely available for customer assessment and selection.

However, whilst customers may be able to choose lenses of the correct power, it is not easy for them to ensure that the distance between the optical centres of spectacle lenses corresponds to the distance between the pupils. If the two distances differ substantially, then problems can occur. When a lens is positioned with its optical centre too far off the optical centre of the eye, the lens acts as a prism. This is undesirable and may lead to eyestrain, but a problem is that it may not be noticed at first. It is frequently only when a user has had the glasses for some time, that the problems begin.

There is thus a need for means by which a user can test whether the distance between the optical centres of lenses in spectacles corresponds to the inter pupil distance without expert assistance. Viewed from one broad aspect there is accordingly disclosed herein a spectacle lens provided with a removable mask with a relatively small window disposed around the optical centre of the lens.

In normal use two such lenses will be incorporated in spectacles and the invention extends to the provision of a pair of such spectacles. The masks are kept in place so that when a user tests the spectacles vision will only be possible through the two small windows. This will produce readily noticeable undesirable effects if the spectacles do not match the inter-pupil distance sufficiently closely. The user will not be able to see well or will see double images. Thus by testing the spectacles in this manner the user will be able more readily to determine whether this parameter is correct. Having selected spectacles which give the required clarity of vision through the mask windows, the user can then remove the masks for final checking, if desired, and subsequent use.

As will be appreciated from the discussion earlier, this proposal is likely to be of the greatest commercial significance in the case of reading spectacles, but it may also be of interest in other instances if it is considered feasible for users to choose ready made spectacles or if an optician wishes to use the system relying on a patient advising him as to what can be seen through the spectacles.

The size of the window in the mask should be determined in accordance with the power of the lens. The more powerful the lens, the smaller the window should be. The more powerful the lens, the smaller the amount of deviation which can be permitted. Tables are available which give the permitted deviation or tolerance for given lens powers. In general, the radius of a window centered on the lens optical centre will be of the same order as the maximum permitted deviation.

It may be found that it is possible to allow a greater prismatic effect vertically than horizontally, so that the testing window can be greater in the vertical direction. In that case the window could be in the form of an ellipse or oval with the major axis oriented in the direction which will be vertical in use. It may also be found that it is not necessary for the centre of the window to coincide exactly with the lens optical centre although this is preferred. It may also be possible to use an asymmetric window.

The determination of the window size may be of considerable importance and viewed from another broad aspect there is disclosed herein a method of preparing a spectacle lens for testing by a user, wherein a mask is applied to the lens, the mask having therein a window whose centre corresponds substantially to the optical centre of the lens, the size of the window being determined in accordance with an inverse relationship to the power of the lens.

The mask may be completely opaque except for the window, for example being black or another dark colour. Alternatively the mask could be in the form of a translucent coloured filter and the test conducted using e.g. text of a corresponding colour. Thus e.g. a red filter could be employed and the user would then test the spectacles on a red text on a white background. If the text cannot be read comfortably then the spectacles are unsuitable.

The mask could conceivably be in the form of a readily removable coating—for example removable by water or another suitable solvent but it is anticipated that in practice it would be a film, tape or the like adhered to the lens. A particularly suitable mask would be in the form of an adherent plastic tape which can be removed without leaving adhesive on the lens. Suitable films are known which are used to protect surfaces and which adhere without the need for adhesives. Treatment of plastics films by flames or by corona discharge is known to provide such properties. It might alternatively be possible to use e.g. a clip-on rigid or semirigid member such as a plastic sheet.

In the case of a tape, film or the like, a tab may be provided for a user to remove the mask without difficulty or the risk of smearing or even scratching the surface of the lens.

The window in a tape, film or the like could be a transparent part or could be in the form of a physical aperture.

As noted above, the spectacles will normally be tested by reading text. However, it is also possible for a user to test them by looking in a mirror, at close range. On looking through one eye the user will see a reflection of the mask and the window. If the user sees the pupil of the eye through the window, and in particular if the pupil is completely within or completely occupies the window, then the spectacles are acceptable as regards the position of the optical centres.

With such a method of testing it may be possible to dispense with a completely opaque mask outside of the window. Thus, the window could be defined by a line, i.e. by a circle centered on the optical centre of the lens. This line could be applied as a coating to the lens—as with the mask—or could be provided on a transparent film or the like which is applied to the lens in the same manner as the mask. The size of the window within the line will again depend on the lens power in most cases.

With all of these possibilities in mind there is disclosed herein, viewed from another broad aspect, a spectacle lens provided with removable means which define visibly the boundary of a relatively small transparent region disposed around the optical centre of the lens. Preferably, the dimensions of the region in any given direction from its centre, whether geometrical or notional, are determined in accordance with the maximum permitted deviation of a user's optical centre from the lens optical centre having regard to the power of the lens.

Under some circumstances, it may be desirable to avoid the need for a user to remove a mask or other means from the spectacles. In this case, permanent or semi-permanent means could be used on the spectacle lenses to define the relatively small region around the optical centre of the lens. Test spectacles would be supplied and a user would use these to determine the acceptability of the spectacles with those particular parameters. After selection, a user would then b provided with a fresh pair of unmarked spectacles and the test pair would be available for use by others.

Thus viewed from another broad aspect there is provided a method of testing reading spectacles in respect of correspondence of the optical centers of the spectacle lenses to the optical centres of the eyes, wherein a user wears and looks through reading spectacles whole lenses are provided with means defining visibly the boundary of a relatively small transparent region disposed around the optical centre of the lens. In the preferred method, the boundary defining means comprise opaque masks over the, lenses in which are provided relatively small windows disposed around the optical centres of the lenses, the user testing the spectacles by attempting to read through the windows.

One example embodying some of the concepts outlined above will now be described with reference to the accompanying drawings in which.

Figure 1:
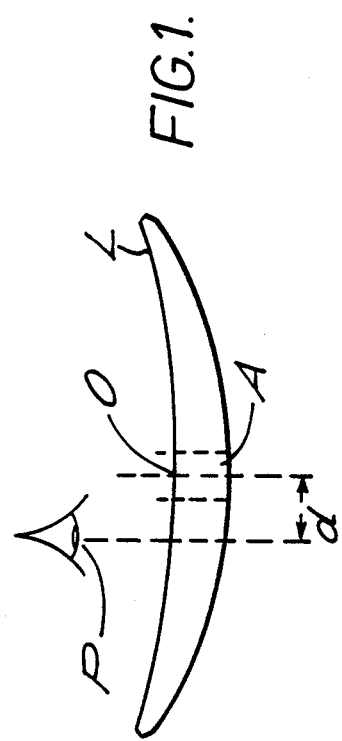
FIG. 1 is a diagram showing a cross-section through a lens.

As shown in FIG. 1, a lens L has an optical centre O. The optical centre P of the eye of somebody looking through the lens is displaced from the lens optical centre by a distance d. If this distance d is too great, then the lens will act as a prism. By making the lens opaque except for a small region A around the optical centre O, the person can only see through the lens over a small field, at an angle. Thus, if the distance d is too great then it will be apparent to the person because vision will be markedly impaired. The region A is centred on the optical centre O and in this case is circular. The region A must be of a suitable size in accordance with the power of the lens. If it is too small, then a minor displacement d which would be acceptable in practice, will appear to be excessive. If the region A is too large, then there may be no visible effect even through the distance d is excessive and would lead to eye strain. The stronger the lens, the more undesirable is the effect of increasing distance d. Hence, the size of the region A is calculated so as to be smaller with increasing lens strength, for example as discussed in broad terms earlier.

In practice, with a lens strength in the range of +0.50 to +3.50 diopters, the region A (if assumed to be circular) can have a radius in the range of 5 mm down to 0.5 mm. In certain cases it may be found that users can tolerate fairly large displacements, beyond the theoretical limits normally applied, and the region A may be correspondingly larger. Acceptable displacements will generally range from 5 or 10 mm to 0.5 mm. The normal inter pupil distance of a user will be about 62 mm for reading, when the eyes tend to converge.

Figure 2:
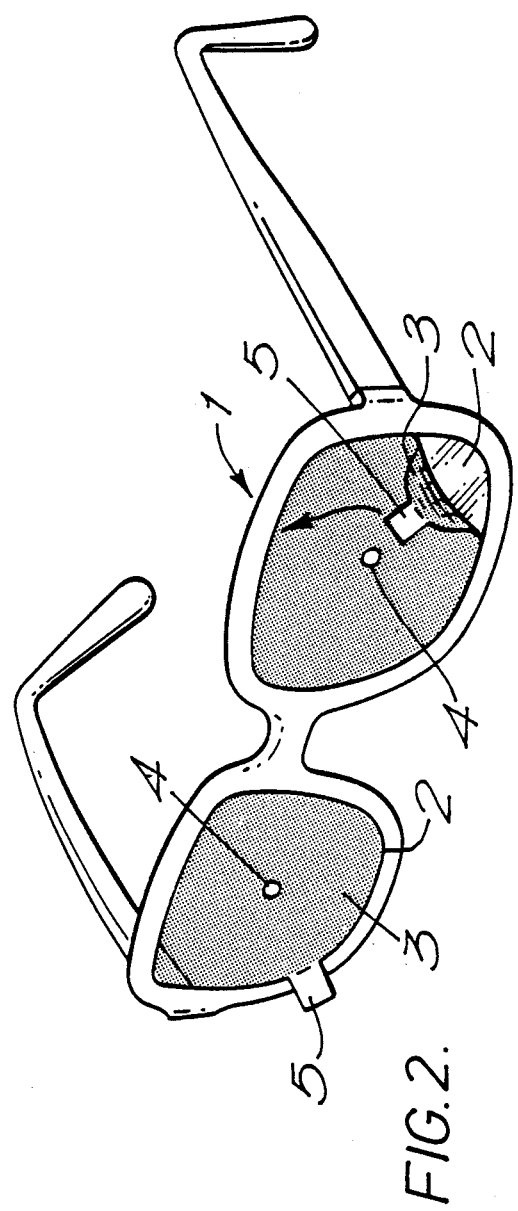
FIG. 2 is a diagrammatic perspective view of a pair of reading spectacles.

A practical embodiment is shown diagrammatically in FIG. 2. A pair of reading spectacles 1 has two lenses 2 in the normal manner and is of any preferred construction. Each lens 2 is covered by a black plastics film 3 which blocks out the lens except for a small aperture 4 which is aligned with the optical centre of the lens 2. The film has surface properties which promote adherence to the surface of the lens 2, and e.g. may have been treated by corona discharge.

With the films in place on each lens, a potential user tries reading with the spectacles. If the optical centres of the users' eyes are displaced excessively from the optical centres of the lenses 2, then the user will find it impossible to read comfortably. If, however the user finds the spectacles to be satisfactory then the film 3 can be peeled off easily by means of tabs 5, as shown for one of the lenses in FIG. 2. Because the films are adhered to the lenses by means of their surface properties and not by means of adhesive, no marks are left on the lenses and the spectacles are ready for immediate use. Furthermore, the films can be replaced if the user decides that, having tried the spectacles with full vision, they are not suitable for reasons of appearance or otherwise. Replacement of the films should preferably be carried out by a supervisor or the like so as to ensure correct alignment. Alignment may be assisted if the film clearly matches substantially the size and shape of the lens and/or fits into frame portions or the like.

The films could carry trade marks, advertising material, instructions or the like to take advantage of the available space on the fronts of the lenses. The films could, of course, be applied to the rear faces of lenses instead. Furthermore any printed matter could be on the side facing the lens, if desired.

It will be appreciated that modifications may be possible both to the specific example discussed above and to the broad concepts disclosed herein whilst still retaining at least some of the advantages obtained.

I claim:

1. A method of preparing a pair of reading spectacles for testing by a user, wherein a mask is applied to each lens of the spectacles, the mask having therein a window whose center corresponds substantially to the optical center of the lens, the size of the window being determined in accordance with an inverse relationship to the strength of the lens.

2. A method as claimed in claim 1, wherein the radial extent of the window from the optical centre of the lens is of the same order as the maximum permitted deviation of the optical centre of the lens from the optical centre of the eye of a user, for the lens strength concerned.

3. A method as claimed in claim 1 or claim 2, wherein the lens strengths are in the range of +0.50 up to +3.50 diopters and the windows have a corresponding radial extent in the range of 5 mm down to 0.5 mm in accordance with the lens strength.

4. A method of preparing and testing a pair of reading spectacles by a user for correspondence of the optical centres of the spectacle lenses to the optical centres of the eyes, comprising the steps of:
   (a) providing a mask having a window for each lens of the spectacles wherein the size of the window is determined in accordance with an inverse relationship to the strength of the lens;
   (b) applying each mask to each lens of the spectacles so that the centre of each window corresponds substantially to the optical centre of the lens; and
   (c) wearing the spectacles and looking through the windows to determine if the optical centres of the lenses are sufficiently aligned with the optical centres of the eyes.

5. The method of claim 4 wherein the radial extent of each window from the optical centre of the lens is of the same order as the maximum permitted deviation of the optical centre of the lens from the optical centre of the eye of the user for a given lens strength.

6. The method of claim 4 or claim 5 wherein the lens strengths are in the range of +0.50 up to +3.50 diopters and the windows have a corresponding radial extent in the range of 5 mm down to 0.5 mm in accordance with the lens strength.

7. The method of claim 4 further including the step of repeating steps (a) through (c) with plural spectacles having different lens strengths.

* * * * *